June 21, 1960 U. M. JONES 2,941,737

AUTOMATICALLY REVERSING TAPE PLAYER

Filed Nov. 22, 1957 7 Sheets-Sheet 1

INVENTOR.
ULISSES M. JONES
BY
McMorrow, Berman + Davidson
ATTORNEYS

June 21, 1960 U. M. JONES 2,941,737

AUTOMATICALLY REVERSING TAPE PLAYER

Filed Nov. 22, 1957 7 Sheets-Sheet 2

INVENTOR.
ULISSES M. JONES
BY
McMorrow, Berman & Davidson
ATTORNEYS

June 21, 1960 U. M. JONES 2,941,737

AUTOMATICALLY REVERSING TAPE PLAYER

Filed Nov. 22, 1957 7 Sheets-Sheet 3

INVENTOR.
ULISSES M. JONES
BY
McMorrow, Berman + Davidson
ATTORNEYS

AUTOMATICALLY REVERSING TAPE PLAYER

Filed Nov. 22, 1957 7 Sheets-Sheet 4

INVENTOR.
ULISSES M. JONES
BY
McMorrow, Berman & Davidson
ATTORNEYS

INVENTOR.
ULISSES M. JONES
BY
McMorrow, Berman + Davidson
ATTORNEYS

June 21, 1960 U. M. JONES 2,941,737

AUTOMATICALLY REVERSING TAPE PLAYER

Filed Nov. 22, 1957

7 Sheets-Sheet 6

INVENTOR.
ULISSES M. JONES
BY
McMorrow, Berman + Davidson
ATTORNEYS

INVENTOR.
ULISSES M. JONES
BY
McMorrow, Berman + Davidson
ATTORNEYS

United States Patent Office 2,941,737

Patented June 21, 1960

2,941,737

AUTOMATICALLY REVERSING TAPE PLAYER

Ulisses M. Jones, 910 W. 17th St., Huntington, W. Va.

Filed Nov. 22, 1957, Ser. No. 698,254

12 Claims. (Cl. 242—55.12)

This invention relates to tape transport mechanisms, and more particularly to an improved magnetic tape reproducing mechanism provided with automatic reversing means.

A main object of the invention is to provide a novel and improved play-back mechanism for magnetic tape, said mechanism being relatively simple in construction, being self-reversing when the end of a tape is approached, and being particularly adapted for use on a motor vehicle in conjunction with the motor vehicle radio receiver.

A further object of the invention is to provide an improved magnetic tape player which is relatively inexpensive to manufacture, which is durable in construction, and which is smooth in operation.

A still further object of the invention is to provide an improved tape transport mechanism which is especially suitable for use on a motor vehicle in conjunction with the motor vehicle radio receiver, the mechanism being relatively compact in size, being reliable in operation, and consuming very small amounts of power.

A still further object of the invention is to provide an improved automatic tape player especially suited for use in conjunction with the radio receiver of a motor vehicle, the player being arranged to utilize a suitable preamplifier and the audio amplifier and loud speaker of the motor vehicle radio receiver, or being arranged to feed a temperature compensated modulated oscillator signal of selected frequency to the radio receiver, without interfering with the normal operation of the receiver.

Further objects and advantages of the invention will become apparent from the following description and claims, and from the accompanying drawings, wherein:

Figures 10, 11, 11A:
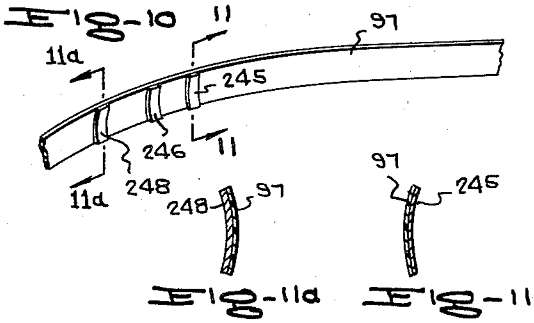
Figure 10 is an enlarged perspective view of the end portion of a magnetic tape adapted to be employed in the tape transport mechanism of Figures 1 to 9.
Figure 11 is an enlarged cross sectional view taken on the line 11—11 of Figure 10.

Figure 11*a* is an enlarged cross sectional view taken on the line 11*a*—11*a* of Figure 10.

Figure 12:
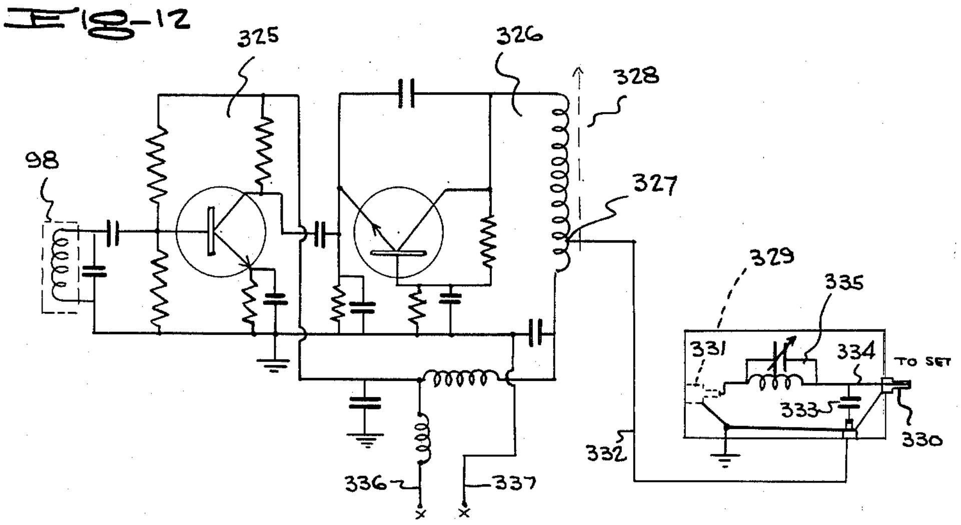

Figure 12 is a schematic wiring diagram showing the circuit of the tape player temperature compensated amplifier and oscillator unit and the coupling device employed therewith to couple the unit to the antenna circuit of a motor vehicle radio receiver.

Figures 13, 14, 15, 16:
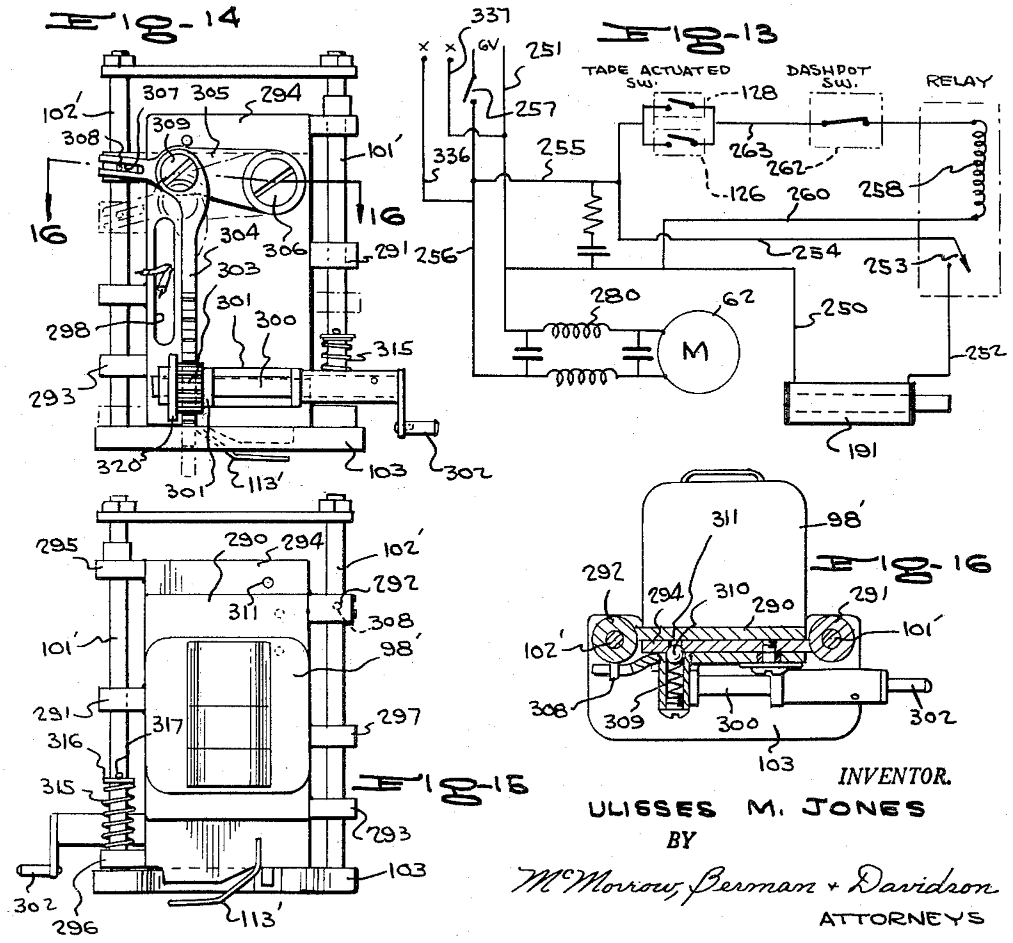

Figure 13 is a wiring diagram showing the power circuit of the tape player of Figures 1 to 12.

Figure 14 is an enlarged rear elevational view of a modified form of pickup head which may be employed with an automatic tape transport mechanism according to the present invention.

Figure 15 is a rear elevational view of the modified pickup head assembly of Figure 14.

Figure 16 is a cross sectional view taken on the line 16—16 of Figure 14.

Figure 17:
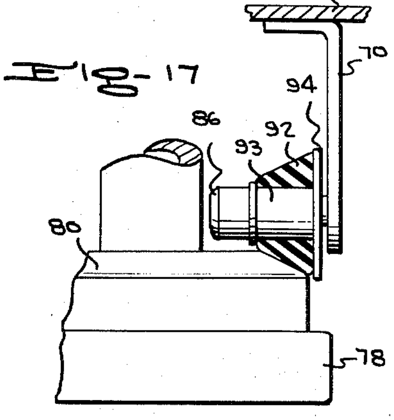

Figure 17 is a cross sectional detail view showing a modified form of drive means for the tape capstans which may be employed in the tape transport mechanism of the present invention.

Referring to the drawings, the tape transport mechanism is designated generally at 20 and comprises a main supporting plate 21 which is notched away at one corner, as shown at 22, to define a forwardly extending arm portion 23. Secured to the under side of the arm portion 23 and extending into the space subjacent the notch 22 is a bracket member 24 formed with the parallel top and bottom arms 25 and 26. Journaled in the arms 25 and 26 is a sleeve member 27. Secured to the sleeve member 27 adjacent and rotatably bearing on the arm 25 is an annular collar member 28, which thus serves as a thrust bearing, supporting the sleeve member on the arm 25. Slidably engaged on the sleeve member 27 above the collar member 28 is a second annular collar member 29, the collar members 28 and 29 being formed with opposing annular seats 30 and 31 receiving the end turns of a coiled spring 32, as shown in Figure 6, whereby the collar 29 is resiliently supported on the collar 28.

Designated at 33 is a hub-carrying member which is engaged on the sleeve 27 and which is clamped against a washer 34 secured to the top end portion of the sleeve 27, for example, a U-shaped washer engaged in oppositely arranged grooves formed in the top end of the sleeve 27, in a manner similar to that described in applicant's previously issued U.S. Patent No. 2,732,144, granted January 24, 1956.

The hub-carrying member 33 is similar in construction to the lower hub-carrying member described in the aforesaid previously issued Patent 2,732,144 and is formed with the peripheral resilient finger elements 35 for receiving the hub-engaging cylindrical central portion 36 of a tape reel 37. The hub member 33 is formed with a bottom flange 38 which is received in a correspondingly shaped recess formed in the cylindrical central portion 36 of the reel, and the upper portion of the inner surface of the cylindrical center 36 of the reel is formed with an inwardly projecting annular rib 39 lockingly engageable in correspondingly shaped recesses formed in the fingers 35.

Figure 6:
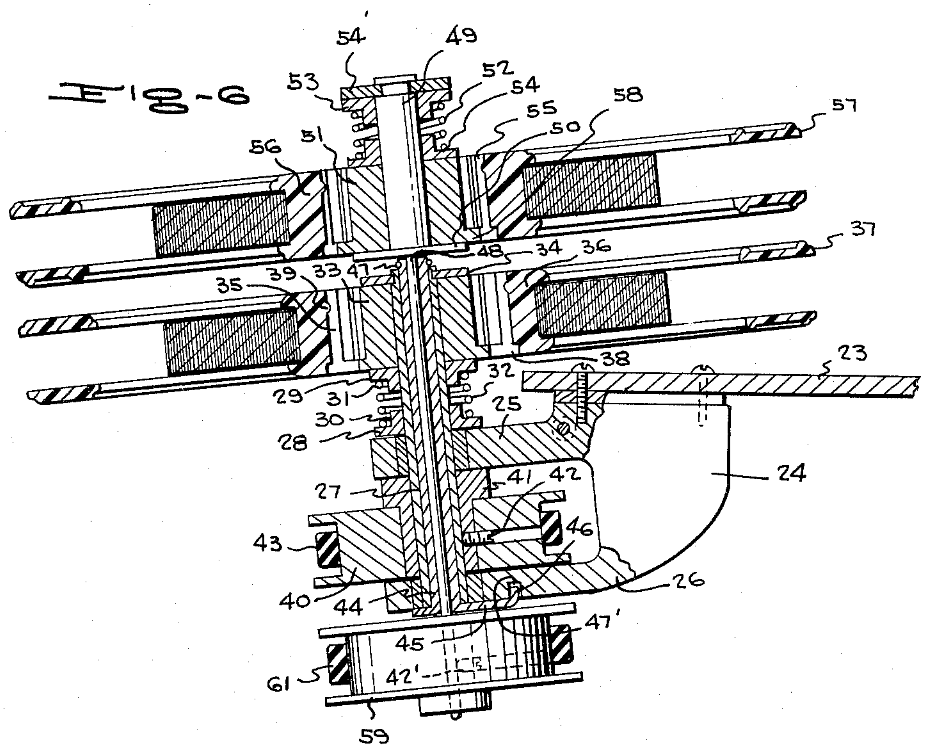
Figure 6 is a transverse vertical cross sectional view taken on the line 6—6 of Figure 1.

Secured on the sleeve member 27 between the arms 25 and 26 is a drive pulley 40, said pulley being rigidly secured on a supporting sleeve 41 which is fastened to the sleeve 27 by a set screw 42, as shown in Figure 6. Engaged on the grooved pulley 40 is a drive belt 43, which is driven in a manner presently to be described.

Designated at 44 is an isolating sleeve which is received within the sleeve 27 and on which the sleeve 27 is freely rotatable. The lower end of the isolating sleeve 44 is formed with an outwardly projecting arm 45 having an upwardly projecting lug 46 at its end which is received in a locking recess 47' formed in the bottom surface of lower bracket arm 26, as shown in Figure 6. A collar element 47 is secured on the sleeve 44 adjacent the top end of the outer sleeve 27, the collar element 47 engaging the top end of outer sleeve 27 and being thus rotatably supported thereon. The sleeve 44 rotatably receives an inner shaft 48, and rigidly secured on the upper portion of shaft 48 immediately above the top end of the sleeve 44 is a sleeve member 49 having a large circular washer 50 rigidly secured to its bottom end.

Supportingly engaged on the sleeve 49 and washer 50 is a second reel hub-carrying member 51 which is clamped against the collar 50 by a coiled spring 52 bearing between an upper annular collar member 53 and a lower annular collar member 54 engaged on sleeve member 49 above the hub-carrying portion 51. A U-shaped locking washer 54' is secured on the top end of the sleeve member 49 to serve as a positive stop means for the upper annular collar member 53. The collar members 53 and 54 are annularly recessed to receive the end turns of the coiled spring 52, as shown, whereby downward clamping pressure is exerted by the spring 52 on the hub-carrying member 51. The hub-carrying member 51 is formed with resilient fingers 55 at its periphery, similar to the fingers 35 of the lower hub-carrying member 33, lockingly engageable in the cylindrical center portion 56 of an upper tape reel 57, as shown. The hub-carrying member 51 is formed with a bottom supporting flange 58 which is receivable in a correspondingly shaped annular recess formed in the lower portion of the cylindrical central member 56 of reel 57, the flange 58 being smaller in outside diameter than the inside diameter of the locking rib 39 of the lower reel 37 so as to allow clearance for the removal of the lower reel 37 whenever necessary without requiring removal of the hub-carrying member 51.

As will be readily apparent, the hub-carrying members 53 and 51 are generally similar to the hub-carrying members disclosed in the aforementioned previously issued patent No. 2,732,144.

As will be readily understood, when it is necessary to remove the reels 57 and 37, the upper reel 57 is first disengaged from its supporting member 51, the resilient fingers 55 of said supporting member being sufficiently flexible to allow the locking rib of the reel to be disengaged from the locking recesses in the resilient fingers responsive to upward force exerted on the reel. After the upper reel 57 is removed, the lower reel 37 may be removed by a similar procedure, the resilient fingers 35 of the hub-carrying member 33 being sufficiently flexible to allow the rib 39 of the lower reel to be disengaged from the recesses in the fingers responsive to exertion of upward force on the reel. The reels may be replaced by following a reverse procedure.

Secured to the lower end of the shaft member 48 is a peripherally grooved drive pulley 59 similar to the drive pulley 40. As shown, the shaft member 48 extends below the arm 26, the drive pulley 59 being secured to said shaft by a set screw 42' immediately subjacent the bottom retaining arm 45 of the isolating sleeve 44. A drive belt 61 is engaged on the grooved pulley 59 and is driven in a manner presently to be described.

Secured to the bottom of the main supporting plate 21 is an electric motor 62 having oppositely projecting shaft end portions on which are secured the respective drive pulleys 63 and 64. The pulley 63 is coupled by a pair of drive belts 65 to a substantially larger pulley 66 which is journaled on a bracket member 67 rigidly secured to the main plate 21 and depending therefrom. The pulley 64 is drivingly coupled to a relatively larger pulley 68, similar to the pulley 66, by a pair of drive belts 69, 69, the pulley 68 being journaled on a depending bracket 70 rigidly secured to the marginal portion of the plate 21 opposite the bracket 67.

Figure 2:
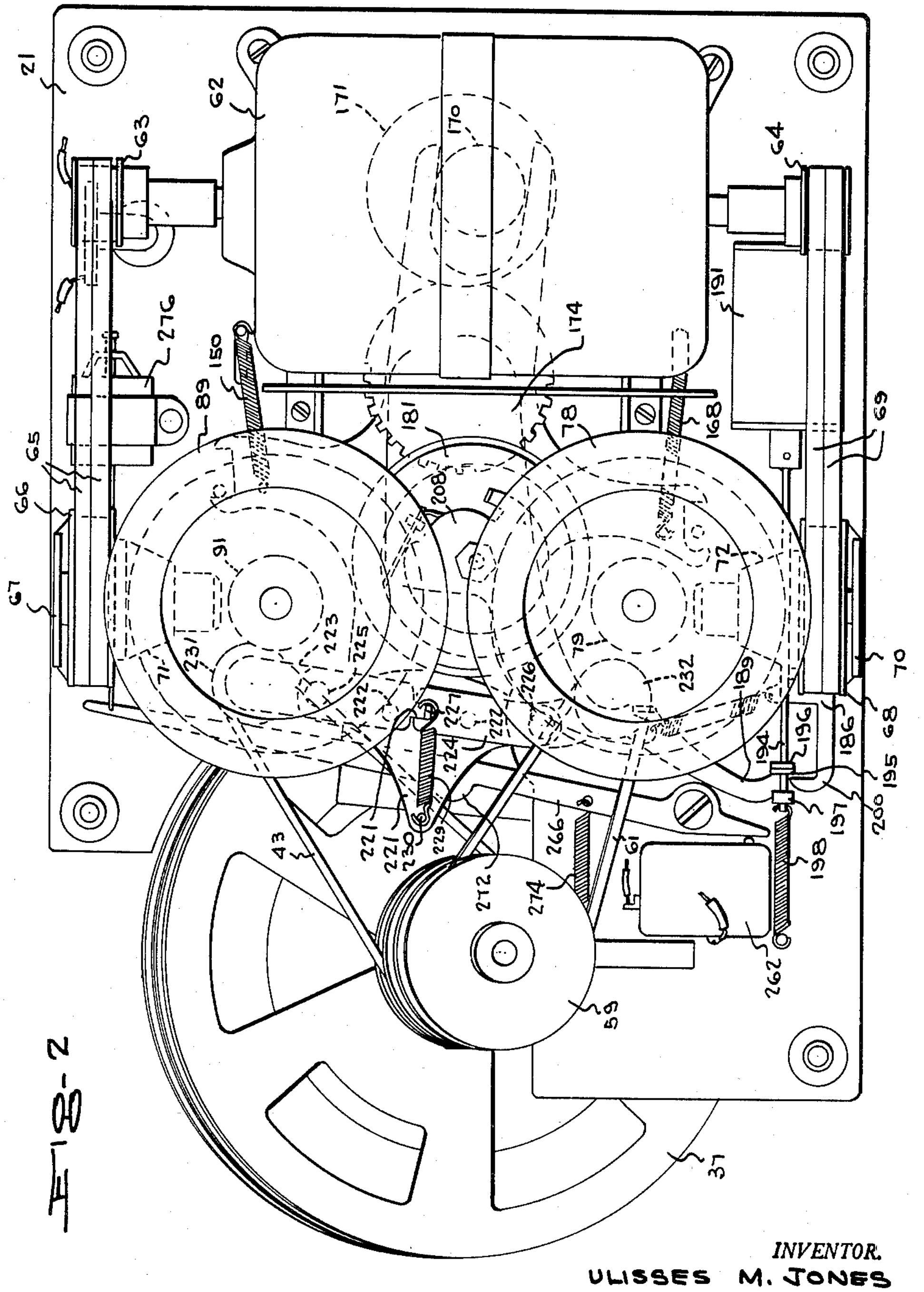
Figure 2 is a bottom view of the tape transport mechanism of Figure 1.

As shown in Figure 2, the pulleys 66 and 68 are generally similar in size and are located substantially in transverse alignment with each other at opposite sides of the mechanism.

The pulley 66 is provided with an inwardly projecting conical friction portion 71 of suitable friction material, such as rubber or the like. The pulley 68 is similarly provided with an inwardly projecting conical friction driving member 72, said conical driving member 72 being of suitable friction material, such as rubber or the like, similar to the member 71.

Figure 5:
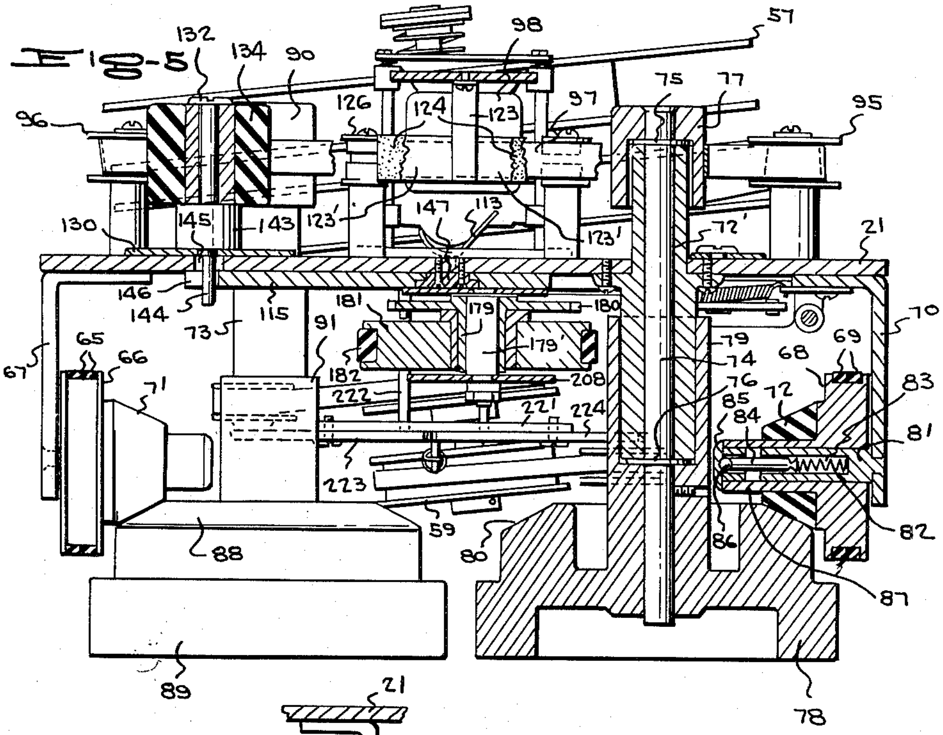
Figure 5 is a transverse vertical cross sectional view taken on the line 5—5 of Figure 1.

Secured in the main supporting plate 21 inwardly adjacent the brackets 67 and 70, as shown in Figure 5, are respective vertical bearing sleeves 72' and 73, said bearing sleeves extending above and below the main plate 21 for substantial distances, as shown in Figure 5. A vertical shaft 74 is journaled in the bearing sleeve 72' and is retained against axial displacement in said bearing sleeve by respective top and bottom thrust collar elements 75 and 76 and engaging the top and bottom surfaces of the bearing sleeve 72', as shown in Figure 5. Secured to the top end of shaft 74 is the capstan roller 77. Secured to the lower end portion of the shaft 74 is the fly wheel pulley 78, said fly wheel pulley 78 being of substantial diameter and mass. The fly wheel pulley 78 is formed with a sleeve portion 79 which rotatably receives the lower portion of the bearing sleeve 72', said sleeve portion 79 being substantially cylindrical and rising for a substantial height from the main body of the flywheel pulley 78. The flywheel pulley 78 is formed with a conical drive surface 80 which is drivingly engaged by the conical friction drive roller 72 of pulley 68, as is clearly shown in Figure 5.

As shown in Figure 5, the depending bracket 70 has rigidly secured thereto an inwardly extending horizontal shaft 81 on which the pulley 68 is journaled. The stationary shaft 81 is formed with an axial recess 82 in which is positioned a tensioning spring 83 which bears outwardly on a tensioning rod 84 slidably engaged in the bore 82 and bearing on a ball bearing element 85 received in a bearing cup 86 secured to the ends of the hollow shaft of pulley 68. The sleeve-like hollow shaft of said pulley, shown at 87, is thus rotatably and slidably supported on the stationary hollow shaft 81 and is biased inwardly by the coiled spring 83. Said spring 83 thus urges the conical friction drive element 72 of pulley 68 against the conical drive surface 80 of flywheel member 78, whereby driving torque is transmitted to said flywheel member and is thence transmitted through the shaft 74 to the capstan roller 77.

In a similar manner, the conical friction element 71 of pulley 66 is urged against the conical driving surface 88 of a second fly wheel member 89 which is secured to the lower end of a shaft journaled in the bearing sleeve 73, to the top end of which is secured a second capstan roller 90 similar to the capstan roller 77. The fly wheel member 89 is furthermore provided with a vertical cylindrical upstanding drive sleeve portion 91 of substantial height, generally similar to the vertical sleeve portion 79 of the fly wheel member 78.

Instead of employing a drive pulley and a concial driving member secured thereto, as shown in Figure 5, driving torque may be transmitted directly to the fly wheel members 89 and 78 in the manner illustrated in Figure 17 by the provision of drive belts of generally triangular cross section, shown at 92 in Figure 17 engaging between rollers 93 journaled to the depending brackets 67 and 70 and extending inwardly over the conical drive surfaces 88 and 80 of the fly wheel members 89 and 78. The rollers 93 may be provided with biasing means urging the belts against the conical surfaces of the fly wheel members, similar to that shown in Figure 5, for example, by the provision of flanges 94 on the rollers which are urged toward the fly wheel conical surfaces by springs, such as springs 83 of Figure 5, acting on the end caps 86, which thus transmit inward force to the flanges 94, causing said flanges to urge the triangular belts 92 toward the fly wheel conical surfaces into driving engagement therewith. The drive belts 92 are coupled directly to suitably shaped pulleys secured to the respective opposite ends of the motor shaft, whereby the motor is coupled directly through the belts 92 to the fly wheel members 78 and 89.

Figure 1:
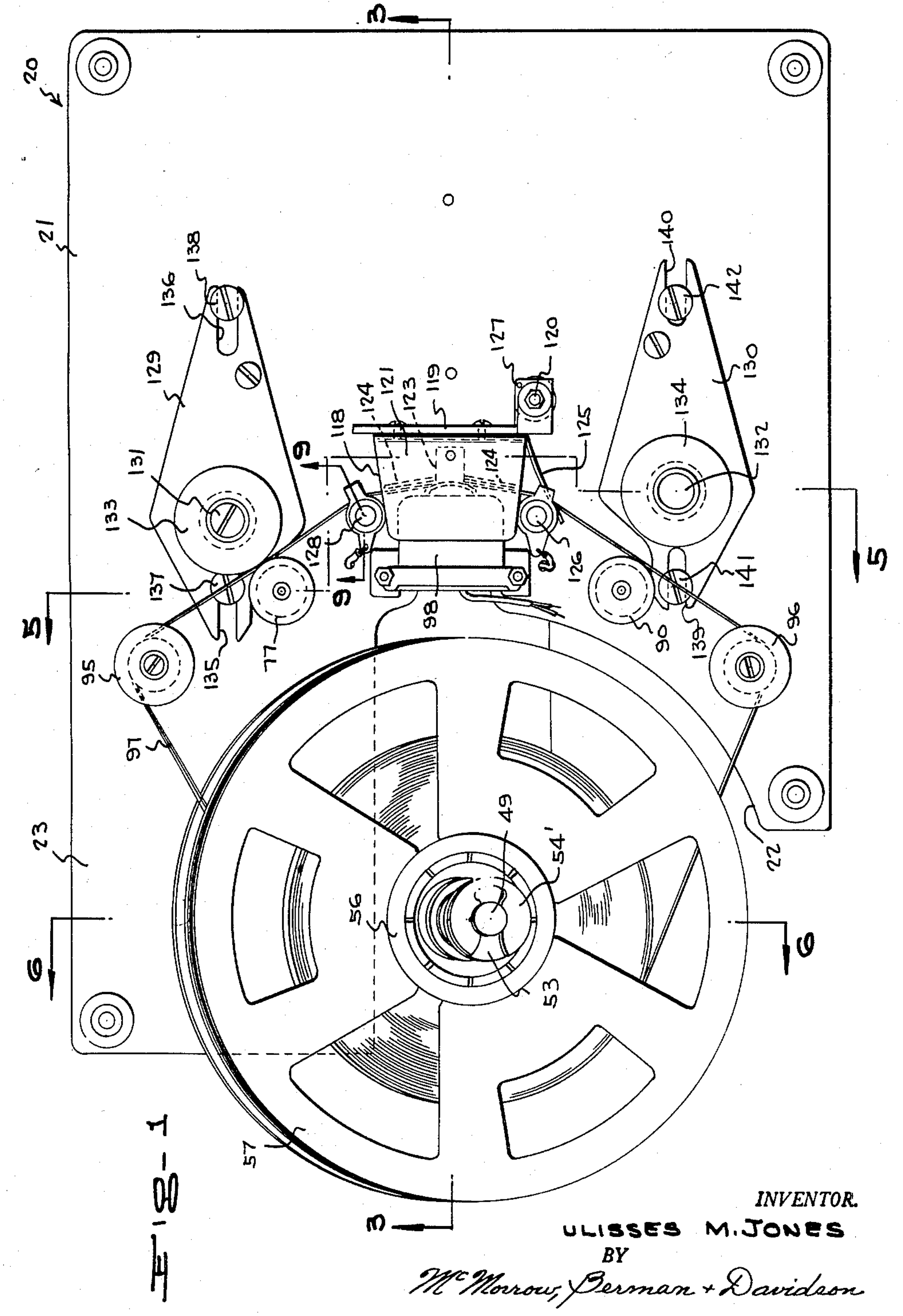
Figure 1 is a top view of an improved automatically reversing tape transport mechanism constructed in accordance with the present invention.

As shown in Figure 1, suitable idler guide rollers 95 and 96 are provided on the main supporting plate 21 outwardly spaced from the respective capstan rollers 77 and 90 to guide the magnetic tape, shown at 97, from one reel to the other past the capstan rollers and past the tape play-back head 98, which is mounted between said capstan rollers, as shown in Figure 1.

Figure 7:
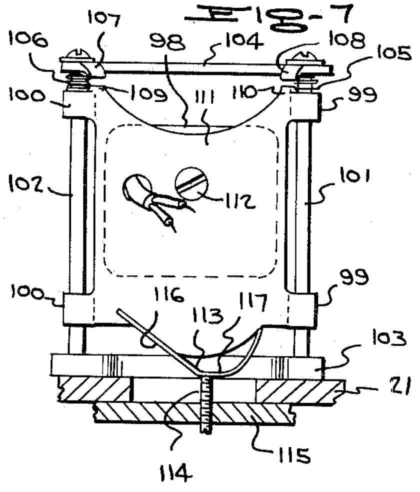
Figure 7 is an enlarged vertical cross sectional detail view taken on the line 7—7 of Figure 3.

As shown in Figure 7, the tape play-back head 98 is provided at its vertical rear corners with respective pairs of spaced vertical supporting sleeve elements 99, 99 and 100, 100 which are slidably engaged on respective vertical supporting post members 101 and 102 rigidly secured to the horizontal base plate 103, which is in turn rigidly secured to the main supporting plate 21. A top bar 104 is rigidly secured to the top ends of the upstanding posts 101 and 102, and respective coiled springs 105 and 106 surround the upper portions of the post members 101 and 102 and bear between the end portions of the top bar 104 and the respective upper sleeve elements 99 and 100, biasing the play-back head 98 downwardly. Depending stop lugs 107 and 108 are provided on the end portions of the top bar 104, engageable with stop shoulder elements 109 and 110 on the vertical head supporting plate 111, to which the playback head is secured, as by a fastening screw 112, limiting the upward movement of the head 98. Secured to the intermediate portion of the bottom edge of the head-supporting plate 111 is a depending resilient cam bar 113 which is engaged by an upwardly projecting elevating screw 114 carried by a horizontally swingable reversing plate 115, presently to be described, which is movable laterally, as viewed in Figure 7, when the tape direction is reversed. As shown in Figure 7, the screw 114 cooperates with an inclined surface portion 116 of the cam bar 113 to raise and lower the head-supporting plate 111. The cam bar 113 has a horizontal terminal portion 117 which rests on the top end of the elevating screw 114 when the head is in its elevated position, as shown in Figure 7. When the plate 115 is moved to the left, as in the case of a reversing action, presently to be described, the head 98 is allowed to descend, by the action of the biasing springs 105 and 106 and the engagement of the inclined portion 116 of cam strap 113 with the top end of the screw 114.

The strap 113 is preferably somewhat resilient, to provide a cushioning action when the head is elevated or lowered and to prevent excessive jarring of the head during this operation.

Figure 3:
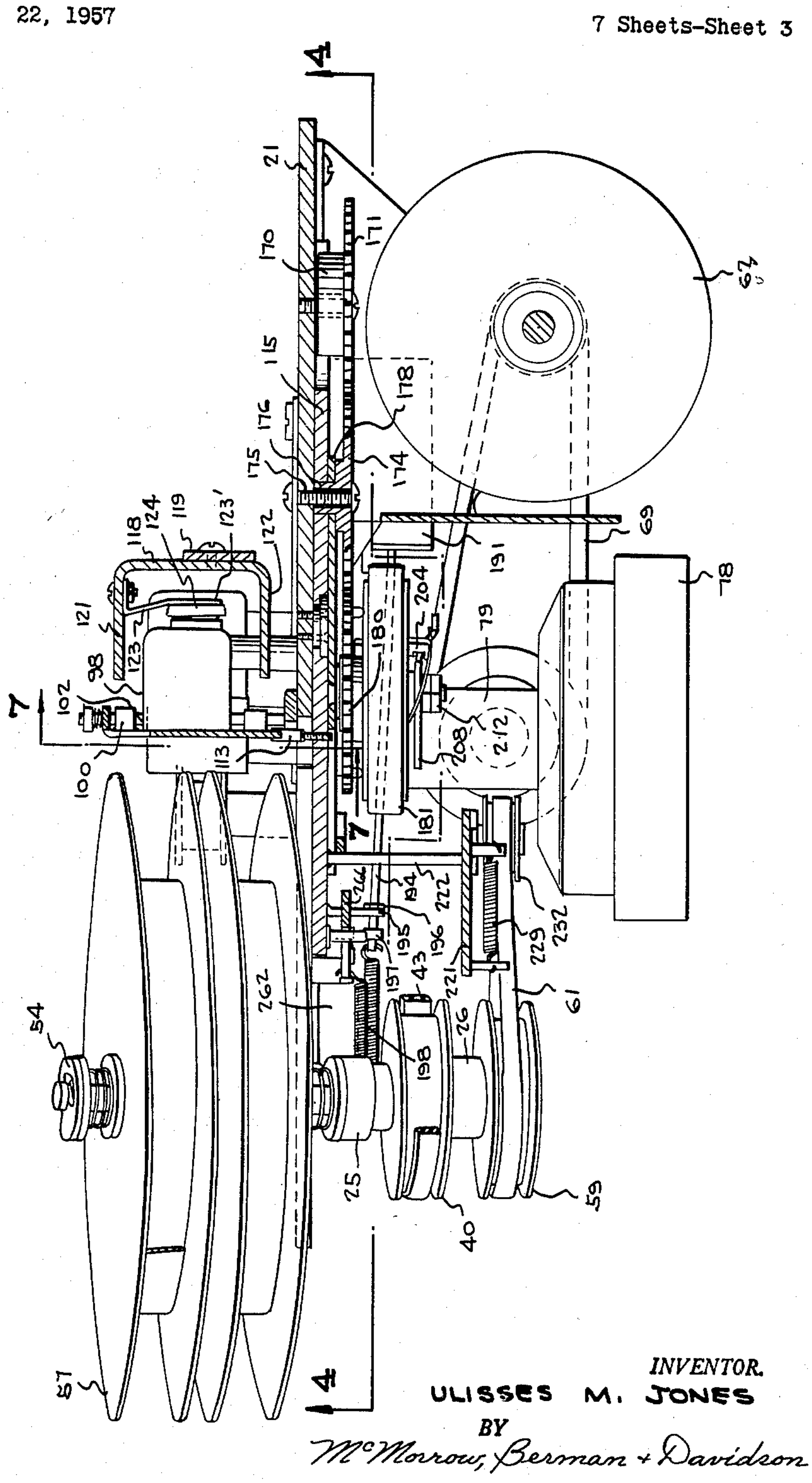
Figure 3 is a longitudinal vertical cross sectional view taken through the tape transport mechanism on the line 3—3 of Figure 1.

Designated at 118 is a generally C-shaped shield member which is mounted on a bracket 119 pivoted to the main plate 21 on a vertical pivot shaft 120, the shield member 118 being located so as to provide a protective enclosure around the forward portion of the tape pickup head 98 but being open at its sides to allow free passage of the tape 97 past the head. Thus, as shown in Figure 3, the shield member 118 has a top horizontal arm 121 and a bottom horizontal arm 122, located to overlie the top and bottom surfaces of the play-back head 98. Secured to the top arm 121 is a depending leaf spring 123 having respective spring arms 123', 123' to which are secured respective felt pressure pads 124, 124 which are urged against the outside surface of the tape 97 and which hold the inside surface of the tape firmly against the air gap portion of the magnetic pickup head 98. The shield member 118 is resiliently biased toward the tape pickup head by the provision of suitable spring means, such as a coiled spring, or the like, connected between the bracket member 119 and the pivot shaft 120 to urge the bracket member 119 in a counter clockwise direction, as viewed in Figure 1. Thus, one end of the coiled spring, shown at 125 in Figure 1 bears against the lower portion of an upstanding post element 126 secured to the main plate 21 at one side of the play-back head 98, whereas the other end of the coiled spring is anchored to the bracket member 119 at 127, the spring being wound in a manner to provide a counter-clockwise biasing action on the bracket member 119, which thus urges the shield member 118 and the pressure pads 124, 124 toward the tape 97 passing between the pressure pad and the air gap portion of the tape play-back head 98.

As shown in Figure 1, the tape engages the air gap portion of the play-back head 98 and is supported at opposite sides of the magnetic pickup head by respective guide assemblies, one of the assemblies being shown at 126 and the other guide assembly being shown at 128 in Figure 1.

Designated respectively at 129 and 130 are respective pressure roller-supporting plates which are slidably mounted on the main tape decks 21 adjacent the respective capstan rollers 77 and 90. The plates 129 and 130 are provided with the vertical spindle shafts 131 and 132 on which are journaled respective pressure rollers 133 and 134 which are movable toward their associated capstans 77 and 90 to exert pressure on the tape 97 between the rollers and the capstans, whereby the movement of the tape is regulated by the rollers. Thus, the capstan members 77 and 90 comprise metal sleeves, whereas the pressure rollers 133 and 134 comprise cylindrical rubber members adapted to exert squeezing force on the tape and to press the tape against the capstan rollers whereby the movement of the capstan rollers accurately regulates the movement of the tape. The pressure roller 133 governs movement of the tape in one direction whereas the pressure roller 134 governs movement of the tape in the opposite direction, in a manner presently to be described.

The plate member 129 is formed at its opposite ends with the respective longitudinally extending open-ended slots 135 and 136 slidably engaged with respective headed guide screws 137 and 138 secured to the tape deck 21. Similarly, the plate member 130 is formed at its opposite ends with the longitudinally extending, open ended guide slots 139 and 140 which slidably interengage with respective headed guide screws 141 and 142 secured to the main plate 21, guiding the plate 130 for longitudinal movement on said main plate in the same manner as the plate member 129 is guided for longitudinal movement on the plate 21. As shown, the spindles 131 and 132 are outwardly offset relative to the axes of the respective capstans 77 and 90, and the longitudinal movement of the pressure rollers 133 toward the capstans is sufficient to cause the pressure rollers to exert clamping action on the tape against the capstans in the manner previously described. As shown in Figure 5, the pressure roller 134 is rotatably mounted on the spindle 132, said spindle being rigidly secured to a cylindrical block 143 secured to the plate 130. Depending axially from the block 143 below the plate 130, and rigid therewith, is a vertical pin 144 which extends through a longitudinal slot 145 in main plate 21 and into a notch 146 formed in the pivotal horizontal plate member 115.

Figure 4:
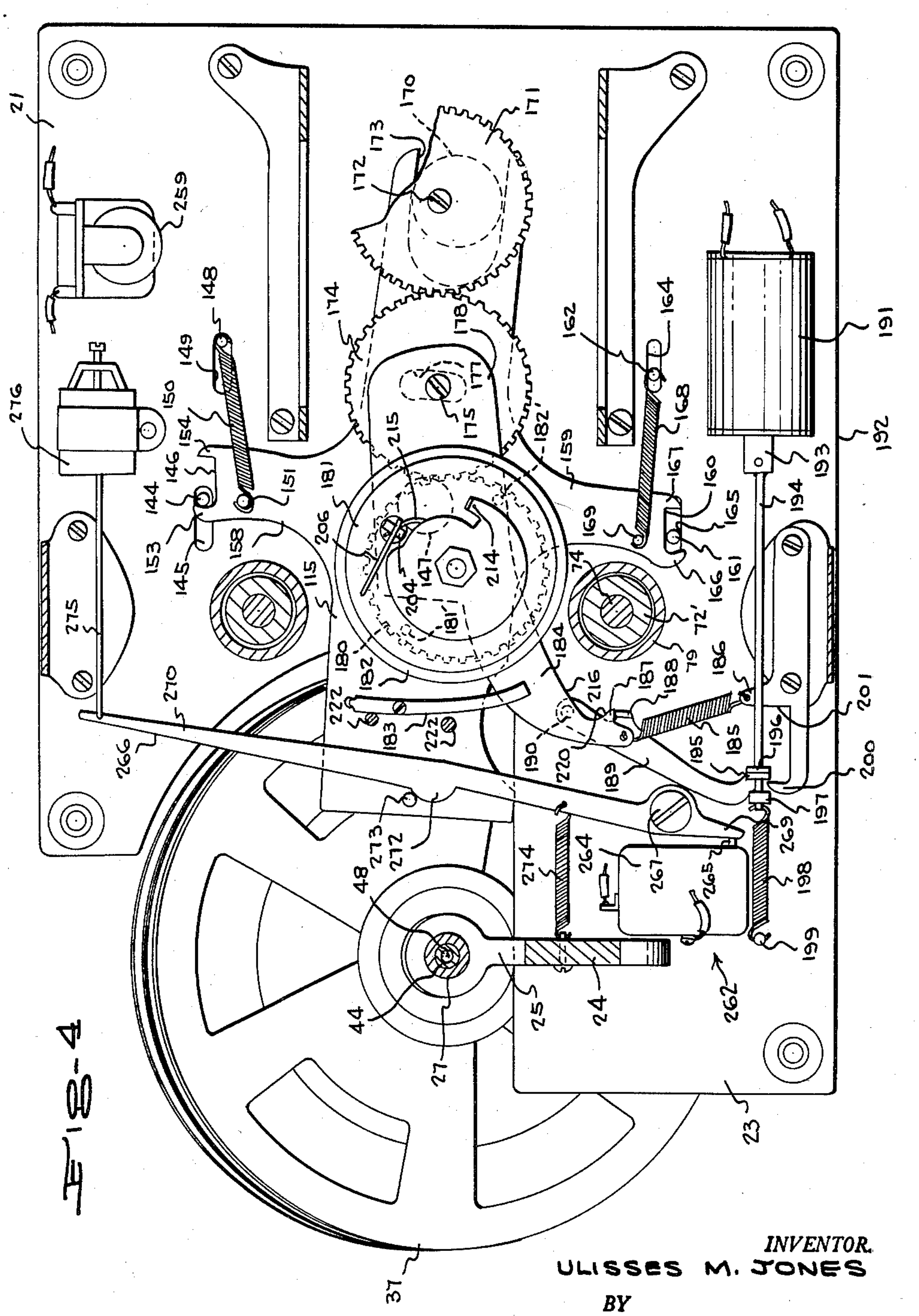
Figure 4 is a horizontal cross sectional view taken on the line 4—4 of Figure 3.

As shown in Figure 5, the plate member 115 is rotatably mounted on a circular shouldered disc member 147 secured to the under side of the main plate 21 subjacent the lower arm 122 of the pivoted shield 118. A second depending pin element 148 is provided on the plate member 130, extending through a longitudinal slot 149 in main plate 21, as shown in Figure 4. A coiled spring 150 connects the depending guide pin 148 to an anchoring pin 151 on the pivoted plate 115 inwardly adjacent the end finger 153 defined by notch 146. Designated at 154 is another end finger defined at the other opposite end of notch 146.

As shown in Figure 4, the plate member 115 is formed with the laterally extending arm portion 158 which has the notch 146 in its end, defining the respective fingers 153 and 154, above mentioned. The pin element 151 is provided at the intermediate portion of the arm 158, whereby the spring 150 biases the plate 130 to the left, as viewed in Figure 4, whereby the depending element 144 is biased against the lug 153.

The plate member 115 is formed at its opposite side with another arm, shown at 159, having the notch 160 formed in its end which receives a depending pin 161 provided axially on the spindle supporting block associated with the spindle 131 and the pressure roller 133. The plate 129 is provided with an additional depending guide pin 162 extending slidably through a longitudinal slot 164 in main plate 21. The pin 161 extends through a longitudinal slot 165 in plate 21 as shown in Figure 4, the notch 160 defining the respective end lugs 166 and 167 on the end of the arm 159. A coiled spring 168 connects pin 162 to an anchor pin 169 provided on the arm 159, biasing the plate member 129 in a direction toward the capstan 77 and urging the pressure roller 133 against the capstan, as shown in Fig. 1.

As will be readily apparent, counter-clockwise rotation of the plate 115, as viewed in Figure 4, will (by the tension in spring 150) move the plate 130 toward capstan 90 and at the same time, lug 166 will engage the pin 161, to move plate 129 away from the capstan 77 and disengage the pressure roller 133 therefrom.

Designated at 170 is an eccentric cam disc which is secured to a gear 171 and which is journaled on a pivot bolt 172 secured to and depending from the main plate 21. As shown in Figure 4, the disc 170 is eccentric with respect to the gear 171, the gear being journaled at its center on the pivot pin 172. The eccentric disc 170 engages in a longitudinal cam slot 173 formed in the end of the plate member 115, whereby the plate member 115 is oscillated around the axis of the pivot disc 147 responsive to rotation of the cam disc 170.

Gear 171 is in meshing engagement with an idler gear 174 which is journaled on a depending pivot bolt 175 secured to the main plate 21, the idler gear 174 being formed with a vertically rising sleeve portion 176 which extends through an arcuate slot 177 formed in the plate member 115, the slot being eccentric with the pivot disc 147, whereby the plate member 115 may oscillate around said pivot disc without interference from the sleeve element 176.

Designated at 178 is a plate member which is pivotally connected to the sleeve element 176, as shown in Figure 3, for rotation adjacent and parallel to the plate member 115. Rigidly secured to and depending from the plate member 178 is a pivot shank 179′ on which is journaled a gear 180 which is similar to and in meshing engagement with the gear 174. Rigidly secured to gear 180 are a pair of diametrically opposed pin elements 181′ and 182′ which are equal radial distances from the axis of rotation of gear 180, and which are employed at times to drive the gear in a counter-clockwise direction as viewed in Figure 4.

Journaled eccentrically on the hub extension 179 of gear 180 is a friction roller 181 having a rubber peripheral element 182 which is at times movable into driving engagement with the sleeve member 79 associated with fly wheel element 78 and capstan roller 77, as will be presently described.

It will be noted that because of the pivotal connection of the plate member 178 to the pivot bolt 175, the gear 180 remains in mesh with the idler gear 174 in all rotated positions of plate member 178 with respect to plate member 115.

A guide strip 183 is secured to the forward portion of the plate member 115, said guide strip 183 being spaced from the plate member 115 and being parallel thereto, to receive the forward arm portion 184 of plate member 178 between said guide strip and the plate member 115 and to slidably support the arm portion 184 for movement parallel and adjacent to plate member 115.

The end of the arm 184 is connected by a coiled spring 185 to a stationary bracket 186, biasing the plate member 178 counter-clockwise, as viewed in Figure 4. The forward end portion of the arm 184 is formed with a triangular pivot lug 187 which is engageable with a detent lug 188 formed on a latch arm 189 pivoted at 190 to the main plate 21 for movement parallel and adjacent to said main plate.

Designated at 191 is a solenoid which is secured to the under side of main plate 21 parallel to and adjacent the side edge 192 of main plate, as shown in Figure 4, the plunger 193 of the solenoid having secured thereto a rod 194 which extends slidably through a depending lug 195 formed on the end of the arm 189. Secured on the rod 194 on opposite sides of the apertured lug 195 are respective abutment collar elements 196 and 197. A coiled spring 198 connects the end of the rod 194 to a pin 199 rigidly secured to the under side of plate member 21 forwardly of the rod, biasing the rod forwardly, namely, to the left as viewed in Figure 4.

Figure 8:
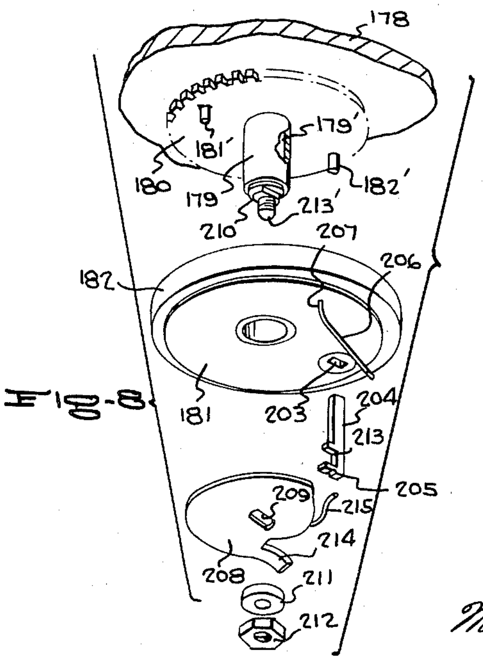
Figure 8 is a perspective view showing the automatic reversing clutch device forming part of the tape transport mechanism of Figures 1 to 7, the parts of the clutch device being shown in separated positions.

The bracket 186 is formed at its forward end with a stop lug 200 against which a portion of the depending apertured lug 195 of arm 189 is engageable to limit clockwise rotation of arm 189, as viewed in Figure 4. The bracket 186 is formed with a abutment shoulder 201 spaced from and opposing the lug 200, to limit counterclockwise rotation of arm 189, the arm 189 being biased counterclockwise by the action of the spring 185 transmitted through the contact angle of lug 187 and detent lug 188. However, the arm 189 is held against counter-clockwise rotation, as viewed in Figure 4, when the lug 188 is lockingly engaged with the lug 187 due to their contact angle, as illustrated in Figure 4, by the force of the reset spring 198. Spring 198 is sufficiently yieldable so that when the solenoid 191 is energized, even momentarily, the rod 194 exerts a force on the lug 195 through collar 197 sufficient to rotate the arm 189 and disengage lug 188 from detent lug 187, after which spring 185 rotates arm 184 in a counter-clockwise direction and brings the friction wheel 181 into driving engagement with the sleeve element 79 of fly wheel 78. The friction wheel 181 is formed with a radial slot 203 located along its maximum radius portion and substantially at the same radial distance from the axis of the pivot shaft 179′ as the pins 181′ and 182′. Slidably engaged in the slot 203 is a driving bar 204 formed at its bottom end with a transverse groove 205 in which is engaged a retaining wire spring 206 secured at 207 to the bottom surface of the friction wheel 181, serving to support the bar 204 in the slot 203 at all times. Rigidly secured on the end of the pivot shaft is a cam plate 208, said cam plate being formed with a slot 209 engaging on and interfitting with an elongated lug portion 210 on the lower end of pivot shaft 179′ and being secured thereon by a washer 211 and a fastening nut 212 engaged on the reduced threaded portion 213′ on the end of shaft 179′, as shown in Figure 8.

The bar 204 is formed with a notch 213 in which the peripheral edge of the cam plate 208 is receivable as the roller 181 rotates around the pivot shaft 179′. The spring 206 biases the bar member 204 upwardly, so that the top portion of the bar member is engageable with one or the other of the driving pins 181′ and 182′. The cam plate 208 is formed with a downwardly curved depending retracting lug 214 which engages with the lower arm defined by notch 213 and is effective to retract the bar member 204 sufficiently to cause the top end of the bar member to clear the driving lugs 181′ or 182′ in a manner presently to be described at the end of a reversing cycle.

Secured to the periphery of the cam plate 208 is a resilient wire holding spring 215 yieldably engageable with the lower portion of the bar member 204, and cooperating with the spring 206 to normally hold the friction roller 181 against rotation on the pivot shaft 179′.

Thus, as shown in Figure 4, the spring 206 engages the bottom groove 205 of bar member 204 whereas the spring 215 engages in the notch 213 and grippingly cooperates with the spring 206 to hold roller 181 against rotation, under normal conditions.

The cam plate 208 is suitably contoured to maintain clearance in the notch 213 as the roller 181 rotates relative to the pivot shaft 179'.

When solenoid 191 is energized, the bar 194 moves to the right approximately ⅛ inch, then contacts and rotates arm 189 counter-clockwise, as viewed in Figure 4, as above described, disengaging detent lug 188 from the triangular catch lug 187, as above rescribed, and allowing the spring 185 to rotate plate member 178 around its pivot bolt 175 in a counter-clockwise direction, as viewed in Figure 4. This brings the rubber periphery 182 of the roller 181 into contact with the driving sleeve 79, causing the roller 181 to rotate in a counter-clockwise direction, as viewed in Figure 4, the driving sleeve 79 rotating clockwise. As roller 181 begins to rotate counter-clockwise, the bar member 204 is disengaged from the yieldable holding spring 215. The elevated bar member 204, after approximately one quarter revolution of roller 181, then engages the driving pin 181' (or 182') and rotates the gear 180 through approximately 180° of rotation, thus transmittting torque through gear 174 and gear 171 to the cam disc 170 which similarly swings plate member 115 from the position shown in Figure 4, for example, to the oppositely oscillated position of the plate 115, retracting the pressure roller plate 129 and moving the pressure roller plate 130 to engage the pressure roller 134 against the capstan 90, as above described. The notch 213 then contacts lug 214, retracting the bar member 204 downwardly, so that the bar member disengages and clears the driven pin 182' (or 181') and continues past the lug 214, where it is again elevated by spring 206 and continues to travel approximately one-quarter turn, and finally is engaged by the spring 215 which enters the notch 213 to restore the condition illustrated in Figure 4, except that the plate member 115 is in its oppositely oscillated position. Because of the eccentricity of the driving roller 181, after the bar member 204 leaves the lug 214, the plate member 178 is gradually rotated counter-clockwise until detent lug 187 engages lug 188, and counter-clockwise movement ceases (when plate 178 was approaching its maximum clockwise travel and allowed clearance, arm 189 with lug 188 and rod 194 were returned to their normal positions by spring 198), disengaging the rubber periphery 182 of the friction roller 181 from the drive sleeve 79 gradually so that by the time the spring 215 engages in the notch 213 of bar member 204 to apply a braking effect on the coasting roller 181, the roller is out of engagement with respect to the drive sleeve 79.

Designated at 221 is a generally triangular horizontal plate member which is rigidly secured to the forward portion of the plate member 115 in spaced parallel relationship thereto, as by a pair of spaced vertical post elements 222, 222. Designated at 223 and 224 are respective horizontal arms which are pivoted at their intermediate portions to the under side of the rear portion of the plate member 221, as shown at 225 and 226. The inner end of the arm 223 is formed with a vertical lug 227 which is pivotally engaged in a notch 228 formed in the inner end of the pivoted arm 224. A coiled spring 229 connects the lug 227 to an anchor pin 230 secured to and depending from the forward corner portion of the triangular plate 221, biasing the inner end portions of the arms 223 and 224 forwardly, namely, to the left, as viewed in Figure 2. Journaled on the end of the arm 223 is a grooved pulley 231, located adjacent the drive sleeve 91 associated with the fly wheel member 89. Journaled on the end of the arm 224 is a similar grooved pulley 232 located adjacent the drive sleeve 79 associated with the fly wheel member 78. The lower friction reel drive belt 61 is engaged on the grooved pulley 232 and the upper friction reel drive belt 43 is engaged on the pulley 231. In the position shown in Figure 2, namely, with the pressure roller 133 in a position forcing the tape against the capstan 77, as shown in Figure 1, the belt 43 is held by spring 229 in driving engagement with the sleeve 91, whereby belt 43 drives sleeve 27 and thus causes reel 37 to exert take-up tension on the tape. In the opposite position of plate member 115, namely, with the pressure roller 134 forcing the tape against the capstan 90 and with the pressure roller 133 retracted, the pulley 232 is disposed closely adjacent to the drive capstan 77 and the belt 61 is forced into driving engagement with the sleeve 79, whereby shaft 48 is driven, causing the reel 57 to exert take-up tension on the tape. Therefore, as will be readily apparent, the take-up tension on the tape is reversed simultaneously with the reversal of the position of the plate member 115, which causes substitution of one drive capstan for the other. Simultaneously with this reversing action the transducer head 98 is moved vertically in accordance with the shift from one direction of movement of the tape to the other, whereby the track is changed simultaneously with the reversal in direction of the tape.

Figure 9:
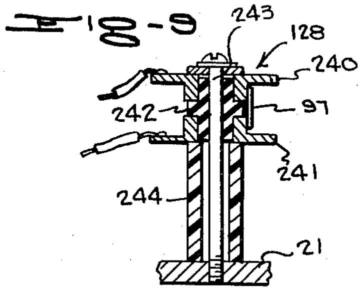
Figure 9 is an enlarged cross sectional detail view taken on the line 9—9 of Figure 1.

The guide members 128 and 126 are disposed on opposite sides of the play-back head 98 and define guide means for guiding the tape past the air gap of the reproducing head. These guide members 128 and 126 are also employed as switch means for automatically initiating the reversing cycle of the mechanism when the end of the tape is approached. Thus, as shown in Figure 9, the guide members comprise a pair of annular conductive collar elements 240 and 241 which are spaced apart by an intervening insulating bushing 242 and which are clamped by a fastening bolt 243 to the main supporting plate 21 on an intervening insulating spacer sleeve 244 through which the bolt 243 extends. The spacer sleeve 244 holds the top and bottom annular collar members 240 and 241 at the proper height to guide the magnetic tape past the air gap of the reproducing head 98, the insulating bushing 242 being formed to space the conductive collar members 240 and 241 apart sufficiently to receive the tape 97 therebetween in the manner shown in Figure 9. The end portions of the tape are provided respectively with a series of transversely extending conductive strips adapted to bridge the conductive collar members 240, 241 and to energize relay means adapted to energize the reversing solenoid 191 in a manner presently to be described.

As shown in Figures 10, 11 and 11$a$, each end of the tape may be provided on its inside surface with a first pair of spaced conductive, transversely extending contact strips 245 and 246, and with a final transversely extending conductive strip 248 which is substantially thicker than the preliminary conductive strips 245 and 246. The final strip 248, being of substantial thickness, insures that the switch means is closed before the end of the tape is reached, and insures that reversing will take place before the end of the tape disengages from its associated reel.

As shown in Figures 10, 11 and 11$a$, the conductive strips 245, 246 and 248 are concave inwardly so as to assure contact at their ends with the switch conductors 240 and 241, to establish bridging contact with said conductors.

Referring now to Figure 13, it will be seen that the solenoid 191 has a first terminal wire thereof, shown at 250, connected to a first power supply wire 251, which may extend to one pole of a suitable battery, for example, the automobile battery of the vehicle in which the apparatus is installed. The other terminal wire 252 of solenoid 191 is connected through relay contact 253 to a wire 254, which is in turn connected by a wire 255 to the remaining power supply wire 256. The power supply wire 256 may be connected through a manually controlled switch 257 to the opposite pole of the battery employed as the power source. Contact 253 is normally open and is controlled by the winding 258 of a relay 259 mounted on the bottom side of the tape deck 21. One terminal wire 260 of relay winding 258 is connected to the wire 250. The other terminal wire 261 of relay 258 is connected through a dashpot switch 262 to a wire 263. Wire 263 is connected through the parallel-connected tape-termination responsive switch devices 128, 126 to the wire 255.

The dashpot switch 262 comprises a normally closed microswitch 264 secured to the under side of the forward portion 23 of tape deck 21, as shown in Figure 4, and having an actuating element 265 engageable by the end of a lever 266 pivoted at 267 to plate 21. Thus, lever 266 has a relatively short arm portion 269 engageable with the actuating element 265 and has a relatively elongated arm portion 270 extending beneath the forward portion of the pivoted plate member 115. Said elongated arm portion 270 is formed at its forward edge with a cam-like projection 272 which is engageable by a depending pin 273 carried by the forward end portion of the plate member 115. The lever 266 is biased in a counter-clockwise direction, as viewed in Figure 4, by a coiled spring 274 connecting arm portion 270 to bracket member 24, as shown in Figure 4. Pivotally connected to the end of arm portion 270 is a rod 275 which is provided with a suitable plunger slidably engaged in a dashpot cylinder 276 fastened to the under side of the tape deck 21, to retard return movement of the lever 266 after said lever has been rotated clockwise. Thus, when the plate member 115 is oscillated, as by a reversing cycle above described, the pin 273 acts against the cam-like projection 272 and rotates the lever 266 clockwise, causing arm 269 to apply force to the actuating element 265 and opening microswitch 264. The micro-switch remains open for a predetermined period of time, depending upon the time required for the plunger associated with dash pot 276 to release under the biasing force of the spring 274. The time delay thus provided insures that the solenoid 191 will be actuated only once to initiate a reversing cycle and that no subsequent actuation of the solenoid will take place after the cycle has been initiated. The dashpot member 276 allows sufficient time to complete the reversing cycle, and to allow the tape to reverse its direction. After release of the lever 266, the micro-switch 264 again closes, resetting the circuit for the next reversing cycle.

As above explained, after the reversing cycle has taken place, the mechanism is reset by the action of spring 198 to engage lug 188 with detent lug 187, preparing the mechanism for the next reversing cycle.

As shown in Figure 13, the motor 62 is connected through a suitable filter circuit 280 to the supply wires 251 and 256 and will become energized responsive to the closure of the manual control switch 257.

Figures 14, 15 and 16 illustrate a modified form of transducer head which may be employed in the apparatus, wherein it may be desired to manually adjust the head for registry with selected pairs of multiple tracks on the tape. Thus, in the modified form of the apparatus illustrated in Figures 14, 15 and 16, the head, shown at 98', is slidably mounted on a pair of vertical post members 101' and 102' rigidly secured to a base plate 103, which is in turn rigidly secured to the tape deck. As shown, the head 98' is secured to a plate member 290 formed at one side edge with a guide ring 291 slidably engaged with the post member 101' and provided at its opposite side edge with the top and bottom guide rings 292 and 293 slidably engaged on the post member 102'. Designated at 294 is an additional plate which is slidably positioned in front of the plate 290 and which is provided with the top and bottom guide rings at one side edge thereof, shown at 295 and 296, slidably engaged on the post member 101' and with the intermediate guide ring 297 at its opposite side edge, slidably engaged on the post member 102'.

The terminal wires of the head 98' extend through a vertical slot 298 formed in the front plate 294, as shown in Figure 14.

Secured to the bottom edge of the front plate 294 is the cam-like bar member 113' which is cammingly engageable by the vertical screw 114 of pivoted plate 115 to raise and lower the transducer head.

The head-supporting plate 290 may be vertically adjusted relative to the cam-carrying plate 294 to provide reversing action relative to a plurality of pairs of tracks on a tape, for example, with respect to three pairs of such tracks in the specific embodiment illustrated in Figures 14, 15 and 16. Thus, a shaft 300 is journaled in a horizontally extending bracket 301 secured to the front plate 294, said shaft being provided with a manual operating handle 302 and with a pinion gear 303 which is in meshing engagement with a vertical rack bar 304 disposed adjacent to front plate 294. A pivoted yoke lever 305 is provided on the upper portion of front plate 294, said yoke lever being pivoted to the front plate by a pivot screw 306, the end of the yoke lever being formed with a slot 307 which slidably receives a pin 308 on the upper guide collar 292 connected to the head-carrying plate 290. As shown in Figure 14, the top end of the rack bar 304 is pivoted to the yoke lever 305 by a hollow pivot stud 309 which contains a spring-pressed ball detent 310 engageable in any one of three spaced apertures 311 provided in the front plate 294. Thus, the head-carrying plate 290 may be adjusted vertically to any one of three positions with respect to the front plate 294, whereby the reversing action may be performed with respect to any one of three spaced pairs of tracks on the magnetic tape.

A coiled spring 315 surrounds the lower portion of the post member 101', bearing between the ring 296 and a collar 316 on the post member 101', said collar being restrained against upward movement by a transverse pin 317, so that the ring 296 is biased downwardly, thus biasing front plate 294 downwardly.

The rack bar 304 is retained in a substantially vertical position by the provision of a retaining flange 320 on the end portion of the shaft 300, the rack bar 304 being disposed between the flange 320 and the inner shaft bearing arm 321 of the generally U-shaped bracket 301.

Referring now to Figure 12, the transducer head 98 (or 98') may be connected to the input of a conventional temperature-compensated transistor preamplifier circuit designated generally at 325 which is employed to modulate a conventional temperature-compensated transistor oscillator 326, providing an output signal at the tap 327 of its output coil 328 of a radio frequency at a desired value in the broadcast band, preferably a frequency which is not employed by any local transmitting station. The modulated radio frequency output from the oscillator 326 is coupled to the input circuit of the automobile radio receiver by means of a coupling device, shown at 329 connected between the radio receiver input circuit and the antenna associated with the receiver. Thus, the coupling device 329 is provided with a male plug 330 which may be engaged with the female antenna connection receptacle of the radio receiver, the coupling device being provided with a female receptacle 331 which may receive the male plug associated with the automobile antenna. The transmission wire 332 from tap 327 of the output coil 328 is electrically connected through a coupling condenser 333 to a wire 334 connected to the prong of the male plug 330. A trap circuit 335 is connected between wire 334 and the center contact of the female plug 331, said trap circuit being tuned to reject a frequency substantially identical to the output frequency of the oscillator 326, whereby to isolate the antenna from the radio receiver with respect to said frequency. This prevents radiation by the automobile antenna of the output frequency of oscillator 326, as well as preventing interference from radio signals received by the antenna at the same frequency.

The preamplifier 325 and oscillator 326 are powered by a pair of supply wires 336 and 337 which are connected respectively to the supply wires 256 and 251, as shown in Figure 13.

Figure 12 illustrates an arrangement whereby the tape transport mechanism may be employed with a conventional motor vehicle radio receiver without requiring any modification of the receiver, and requiring merely the use of a coupling device 329 which is interposed between the vehicle antenna and the input circuit of its receiver.

While certain specific embodiments of an improved tape playing mechanism and circuits associated therewith have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a tape transport mechanism of the type including a support, a pair of reels journaled on said support and arranged to receive the opposite end portions of a magnetic tape wound thereon and a magnetic transducer head, the improvement comprising a pair of drive capstans journaled on said support, guide means for supporting a magnetic tape wound on said reels adjacent said transducer head and adjacent said drive capstans, means driving said capstans in opposite directions of rotation, a pair of pressure rollers adjacent the respective drive capstans, means slidably supporting said pressure rollers on said support and being constructed and arranged to guide said pressure rollers for movement toward and away from said drive capstans, a plate member pivoted to said support and being formed and arranged to drivingly engage said last-named means to simultaneously move one pressure roller towards and the other away from the respective capstans, and vice versa, responsive to pivotal movement of said plate member, and electro-magnetic means controlling the pivotal movement of said plate member.

2. In a tape transport mechanism of the type including a support, a pair of reels journaled on said support and arranged to receive the opposite end portions of a magnetic tape wound thereon and a magnetic transducer head, the improvement comprising a pair of drive capstans journaled on said support, guide means for supporting a magnetic tape wound on said reels adjacent said transducer head and adjacent said drive capstans, means driving said capstans in opposite directions of rotation, a pair of pressure rollers adjacent the respective drive capstans, means slidably supporting said pressure rollers on said support and being constructed and arranged to guide said pressure rollers for movement toward and away from said drive capstans, a plate member pivoted to said support and being formed and arranged to drivingly engage said last-named means to simultaneously move one pressure roller towards and the other away from the respective capstans, and vice versa, responsive to pivotal movement of said plate member, means drivingly coupling the reels to the respective capstans in accordance with the direction of the pivotal movement of the plate member and being formed and arranged to rotate the reels in the same direction as the capstans, and electromagnetic means controlling the pivotal movement of said plate member.

3. In a tape transport mechanism of the type including a support, a pair of reels journaled on said support and arranged to receive the opposite end portions of a magnetic tape wound thereon and a magnetic transducer head, the improvement comprising a pair of drive capstans journaled on said support, guide means for supporting a magnetic tape wound on said reels adjacent said transducer head and adjacent said drive capstans, means driving said capstans in opposite directions of rotation, respective roller supports slidably mounted on said first-named support adjacent the means guiding said roller supports for movement toward and away from the capstans, respective drive capstans, respective pressure rollers journaled on the roller supports and being engageable with the drive capstans responsive to movement of the roller supports towards the capstans, a plate member pivoted to the first-named support, means drivingly coupling said plate member to said roller supports and being formed and arranged to simultaneously move one pressure roller support towards the other away from the respective capstans, and vice versa, responsive to pivotal movement of said plate member, and electromagnetic means controlling the pivotal movement of said plate member.

4. In a tape transport mechanism of the type including a support, a pair of reels journaled on said support and arranged to receive the opposite end portions of a magnetic tape wound thereon, and a magnetic transducer head, the improvement comprising a pair of drive capstans journaled on said support, guide means for supporting a magnetic tape wound on said reels adjacent said transducer head and adjacent said drive capstans, means driving said capstans in opposite directions of rotation, respective roller supports slidably mounted on said first-named support adjacent the respective drive capstans, means guiding said roller supports for movement toward and away from the capstans, respective pressure rollers journaled on the roller supports and being engageable with the drive capstans responsive to movement of the roller supports toward the capstans, a plate member pivoted to the first-named support, means drivingly coupling said plate member to said roller supports and being formed and arranged to simultaneously move one pressure roller support towards and the other away from the respective capstans, and vice versa, responsive to pivotal movement of said plate member, electromagnetic means controlling the pivotal movement of said plate member, and means for moving the transducer head vertically responsive to pivotal movement of said plate member.

5. In a tape transport mechanism of the type including a support, a pair of reels journaled on said support and arranged to receive the opposite end portions of a magnetic tape wound thereon, and a magnetic transducer head, the improvement comprising a pair of drive capstans journaled on said support, guide means for supporting a magnetic tape wound on said reels adjacent said transducer head and adjacent said drive capstans, means driving said capstans in opposite directions of rotation, a pair of pressure rollers adjacent the respective drive capstans, means slidably supporting said pressure rollers on said support and being constructed and arranged to guide said pressure rollers for movement toward and away from said drive capstans, a plate member pivoted to said support and being formed and arranged to drivingly engage said last-named means to simultaneously move one pressure roller towards and the other away from the respective capstans, and vice versa, responsive to pivotal movement of said plate member, switch means on the support adjacent the transducer head and in the path of movement of the magnetic tape, electromagnetic means controlling the pivotal movement of said plate member, and means energizing said electromagnetic means responsive to the closure of said switch means.

6. In a tape transport mechanism of the type including a support, a pair of reels journaled on said support and arranged to receive the opposite end portions of a magnetic tape wound thereon, and a magnetic transducer head, the improvement comprising a pair of drive capstans journaled on said support, guide means for supporting a magnetic tape wound on said reels adjacent said transducer head and adjacent said drive capstans, means driving said capstans in opposite directions of rotation, respective roller supports slidably mounted on said first-named support adjacent the respective drive capstans, means guiding said roller supports for movement toward and away from the capstans, respective pressure rollers journaled on the roller supports and being engageable with the drive capstans responsive to movement of the roller supports toward the capstans, a plate member pivoted to the first-named support, means drivingly coupling said plate member to said roller support and being formed and arranged to simultaneously move one pressure roller support towards and the other away from the respective capstans, and vice versa, responsive to pivotal movement of said plate member, means drivingly coupling the reels to the respective capstans in accordance with the direction of pivotal movement of the plate member and being formed and arranged to rotate the reels in the same direction as the capstans, electromagnetic means controlling the pivotal movement of said plate member, switch means on the support adjacent the transducer head and in the path of movement of the magnetic tape, and means energizing said electromagnetic means responsive to the closure of said switch means.

7. In a tape transport mechanism of the type including a support, a pair of reels journaled on said support and arranged to receive the opposite end portions of a magnetic tape wound thereon, and a magnetic transducer head, the improvement comprising a pair of drive capstans journaled on said support, guide means for supporting a magnetic tape wound on said reels adjacent said transducer head and adjacent said drive capstans, means driving said capstans in opposite directions of rotation, a pair of pressure rollers adjacent the respective drive capstans, means slidably supporting said pressure rollers on said support and being constructed and arranged to guide said pressure rollers for movement toward and away from said drive capstans, a plate member pivoted to said support and being formed and arranged to drivingly engage said last-named means to simultaneously move one pressure roller towards and the other away from the respective capstans, and vice versa, responsive to pivotal movement of said plate member, electromagnetic means controlling the pivotal movement of said plate member, switch means on the support adjacent said transducer head and in the path of movement of the magnetic tape, means energizing said electromagnetic means responsive to the closure of said switch means, and normally closed further switch means connected in circuit with said electromagnetic means, and means opening said further switch means and maintaining said further switch means open for a predetermined time period responsive to pivotal movement of said plate member.

8. In a tape transport mechanism of the type including a support, a pair of reels journaled on said support and arranged to receive the opposite end portions of a magnetic tape wound thereon, and a magnetic transducer head, the improvement comprising a pair of drive capstans journaled on said support, guide means for supporting a magnetic tape wound on said reels adjacent said transducer head and adjacent said drive capstans, means driving said capstans in opposite directions of rotation, a pair of pressure rollers movably mounted on said support adjacent the respective drive capstans, a plate member pivoted to said support and being formed and arranged to move one pressure roller towards and the other away from the respective capstans, and vice versa, responsive to pivotal movement thereof, an electromagnet, rotatable cam means mounted on said support and being formed and arranged to rotate said plate member, and means drivingly coupling said cam means to one of the drive capstans responsive to energization of said electromagnet.

9. In a tape transport mechanism of the type including a support, a pair of reels journaled on said support and arranged to receive the opposite end portions of a magnetic tape wound thereon, and a magnetic transducer head, the improvement comprising a pair of drive capstans journaled on said support, guide means for supporting a magnetic tape wound on said reels adjacent said transducer head and adjacent said drive capstans, means driving said capstans in opposite directions of rotation, a pair of pressure rollers movably mounted on said support adjacent the respective drive capstans, a plate member pivoted to said support and being formed and arranged to move one pressure roller towards and the other away from the respective capstans, and vice versa, responsive to pivotal movement thereof, an electromagnet, motatable cam means mounted on said support and being formed and arranged to oscillate said plate member between a first position wherein one of the pressure rollers engages its associated capstan and a second position wherein the other pressure roller engages its associated capstan, and means drivingly coupling said cam means to one of the drive capstans for a period sufficient to move the plate member from one of said positions to the other responsive to energization of said electromagnet.

10. In a tape transport mechanism of the type including a support, a pair of reels journaled on said support and arranged to receive the opposite end portions of a magnetic tape wound thereon, and a magnetic transducer head, the improvement comprising a pair of drive capstans journaled on said support, guide means for supporting a magnetic tape wound on said reels adjacent said transducer head and adjacent said drive capstans, means driving said capstans in opposite directions of rotation, respective roller supports slidably mounted on said first-named support adjacent the respective drive capstans, respective pressure rollers journaled on the roller supports and being engageable with the drive capstans responsive to movement of the roller supports toward the capstans, a plate member pivoted to the first-named support, means drivingly coupling said plate member to said roller supports and being formed and arranged to move one pressure roller towards and the other away from the respective capstans, and vice versa, responsive to pivotal movement thereof, means drivingly coupling the reels to the respective capstans in accordance with the direction of pivotal movement of the plate member and being formed and arranged to rotate the reels in the same direction as the capstans, an electromagnet, rotatable cam means mounted on said support and being formed and arranged to oscillate said plate member between a first position wherein one of the pressure rollers engages its associated capstan and a second position wherein the other pressure roller engages its associated capstan, means drivingly coupling said cam means to one of the drive capstans for a period sufficient to move the plate member from one of said positions to the other responsive to the energization of said electromagnet, switch means on the support adjacent the transducer head and in the path of movement of the magnetic tape, means energizing said electromagnetic means responsive to the closure of said switch means, normally closed further switch means connected in circuit with said electromagnetic means, and means opening said further switch means and maintaining said further switch means open for a predetermined time period responsive to pivotal movement of said plate member.

11. In a tape transport mechanism of the type including a support, a pair of reels journaled on said support and arranged to receive the opposite end portions of a magnetic tape wound thereon, and a magnetic transducer head, the improvement comprising a pair of drive capstans journaled on said support, guide means for supporting a magnetic tape wound on said reels adjacent said transducer head and adjacent said drive capstans, means driving said capstans in opposite directions of rotation, a pair of pressure rollers movably mounted on said support adjacent the respective drive capstans, a plate member pivoted to said support and being formed and arranged to move one pressure roller towards and the other away from the respective capstans, and vice versa, responsive to pivotal movement thereof, an electromagnet, rotatable cam means mounted on said support and being formed and arranged to oscillate said plate member between a first position wherein one of the pressure rollers engages its associated capstan and a second position wherein the other pressure roller engages its associated capstan, drive means operatively connected to said cam means, means biasing said drive means into driving engagement with one of the drive capstans, detent means restraining engagement of said drive means with said one of the capstans, means releasing said detent means responsive to energization of said electromagnet, and means to reset said detent means and to disengage said drive means from said one of the drive capstans responsive to the movement of the plate member from one of said positions to the other.

12. In a tape transport mechanism of the type including a support, a pair of reels journaled on said support and arranged to receive the opposite end portions of a magnetic tape wound thereon, and a magnetic transducer head, the improvement comprising a pair of drive capstans journaled on said support, guide means for supporting a magnetic tape wound on said reels adjacent said transducer head and adjacent said drive capstans, means driving said capstans in opposite directions of rotation, respective roller supports slidably mounted on said first-named support adjacent the respective drive capstans, respective pressure rollers journaled on the roller supports and being engageable with the drive capstans responsive to movement of the roller supports toward the capstans, a plate member pivoted to the first-named support, means drivingly coupling said plate member to said roller supports and being formed and arranged to move one pressure roller towards and the other away from the respective capstans, and vice versa, responsive to pivotal movement thereof, means drivingly coupling the reels to the respective capstans in accordance with the direction of pivotal movement of the plate member and being formed and arranged to rotate the reels in the same direction as the capstans, an electromagnet, rotatable cam means mounted on said support and being formed and arranged to oscillate said plate member between a first position wherein one of the pressure rollers engages its associated capstan and a second position wherein the other pressure roller engages its associated capstan, drive means operatively connected to said cam means, means biasing said drive means into driving engagement with one of the drive capstans, detent means restraining engagement of said drive means with said one of the capstans, means releasing said detent means responsive to energization of said electromagment, means to reset said detent means and to disengage said drive means from said one of the drive capstans responsive to the movement of the plate member from one of said positions to the other, switch means on the support adjacent the transducer head and in the path of movement of the magnetic tape, means energizing said electromagnetic means responsive to the closure of said switch means, normally closed further switch means connected in circuit with said electromagnetic means, and means opening said further switch means and maintaining said further switch means open for a predetermined time period responsive to pivotal movement of said plate member.

References Cited in the file of this patent

UNITED STATES PATENTS

| | | |
|---|---|---|
| 2,291,105 | Rebold | July 28, 1942 |
| 2,548,531 | Hayes | Apr. 10, 1951 |
| 2,655,565 | Thompson | Oct. 11, 1953 |
| 2,694,110 | Roberts | Nov. 9, 1954 |
| 2,732,144 | Jones | Jan. 24, 1956 |

FOREIGN PATENTS

| | | |
|---|---|---|
| 698,402 | Great Britain | Oct. 14, 1953 |
| 1,037,029 | France | Apr. 29, 1953 |